United States Patent [19]

Galichon

[11] Patent Number: 4,743,413
[45] Date of Patent: May 10, 1988

[54] METHOD OF MANUFACTURING THERMOSTABLE PIECES MADE FROM COMPOSITE MATERIALS AND THE PIECES THUS OBTAINED

[76] Inventor: Jean P. Galichon, 16 avenue Hoche, 75008 Paris, France

[21] Appl. No.: 889,114

[22] Filed: Jul. 23, 1986

[51] Int. Cl.$^4$ .................. B05D 1/24; B29C 47/02
[52] U.S. Cl. .................. 264/24; 156/180; 264/131; 264/135; 264/136; 264/137; 264/174; 264/320; 427/32; 427/185; 427/258; 427/374.3; 427/407.2; 427/409; 427/412.3; 428/383
[58] Field of Search .............. 264/24, 103, 131, 135, 264/136, 137, 174, 257, 258, 320, 324, 236, 237, DIG. 72; 156/62.2, 180, 181; 427/32, 185, 258, 374.3, 385.5, 386, 388.1, 389.7, 407.2, 409, 410, 412.3; 428/378, 383, 394, 395, 396

[56] References Cited

U.S. PATENT DOCUMENTS

| | | | |
|---|---|---|---|
| 2,979,431 | 4/1961 | Perrault | 264/135 X |
| 3,022,200 | 2/1962 | Koerner et al. | 428/383 |
| 3,305,417 | 2/1967 | Christie | 156/90 |
| 3,532,783 | 10/1970 | Pusey et al. | 264/135 |
| 3,657,040 | 4/1972 | Shobert | 264/174 X |
| 3,711,898 | 1/1973 | Debbas | 264/24 X |
| 3,742,106 | 6/1973 | Price | 264/131 |
| 3,773,592 | 11/1973 | Nicolaus et al. | 264/24 XC |
| 3,837,981 | 9/1974 | Flint | 428/189 |
| 3,862,287 | 1/1975 | Davis | 264/131 |
| 3,919,437 | 11/1975 | Brown et al. | 427/32 X |
| 3,924,737 | 12/1975 | Ernst et al. | 206/524.5 |
| 3,946,097 | 3/1976 | Takahashi et al. | 264/174 X |
| 3,947,537 | 3/1976 | Buntin et al. | 264/137 |
| 3,975,483 | 8/1976 | Rudloff | 264/137 |
| 4,058,581 | 11/1977 | Park | 264/136 |
| 4,088,809 | 5/1978 | Elbling et al. | 427/32 X |
| 4,183,888 | 1/1980 | Mutzke | 264/131 |
| 4,217,389 | 8/1980 | Peterson | 428/383 |
| 4,244,985 | 1/1981 | Graff et al. | 427/185 X |
| 4,394,338 | 6/1983 | Fuwa | 264/135 |
| 4,420,535 | 12/1983 | Walrath et al. | 428/383 X |
| 4,420,536 | 12/1983 | Saunders et al. | 428/383 |
| 4,444,700 | 4/1984 | Fondren | 264/24 |
| 4,505,978 | 3/1985 | Smith | 428/383 X |
| 4,614,678 | 9/1986 | Ganga | 264/174 X |

FOREIGN PATENT DOCUMENTS

| | | | |
|---|---|---|---|
| 1306656 | 9/1962 | France. | |
| 1348800 | 2/1963 | France | 264/24 |
| 2224516 | 10/1967 | France. | |
| 2463159 | 2/1981 | France. | |
| 48-5110 | 2/1973 | Japan | 156/180 |
| 59-67014 | 4/1984 | Japan | 264/136 |
| 1334702 | 10/1973 | United Kingdom | 264/131 |
| 2082112 | 3/1982 | United Kingdom | 264/136 |

OTHER PUBLICATIONS

Checkel, R. L., "Fluidized Polymer Deposition", Modern Plastics (Oct., 1958), pp. 125–132.

Primary Examiner—Jeffery Thurlow
Assistant Examiner—Leo B. Tentoni

[57] ABSTRACT

A roving laid flat of unitary metal, mineral or synthetic filaments is treated with a powder, whose grain size is equal to the diameter of the filaments, of a plastic material chosen either from the group of thermosetting polyers including the epoxides, the phenolics, the polyesters with terminal groups —COOH, the polyimides, the acrylics and the polyurethanes, or prepolymerized polyamides modified by diamines, polyolefins modified by maleic anhydride or acrylic acid, partially hydrolized EVA copolymers, the E-VA-maleic anhydride terpolymers and eva copolymers grafted by the acrylic radical, then the powder charged rovings are coated by a thermoplastic polymer, such as polyamides, copolyamides and linear polyesters, the material thus obtained being placed in a mold under pressure and at a temperature not exceeding 170° C.

11 Claims, No Drawings

METHOD OF MANUFACTURING THERMOSTABLE PIECES MADE FROM COMPOSITE MATERIALS AND THE PIECES THUS OBTAINED

BACKGROUND OF THE INVENTION

The present invention relates to a method of manufacturing pieces made from thermostable composite materials from fibrous materials in which synthetic resin powders are incorporated, said fibrous materials thus obtained having great flexibility, being then subjected to a heat forming element in a mold for obtaining rigid pieces made from composite materials indeformable to heat at a temperature of at least 150° C.

It was already known how to incorporate plastic material powder in a fibrous material in the roving condition, for example by passing it through a fluidized bed of powder. It was noted that the use of such a method operating on compact rovings did not always allow the incorporation of a sufficient proportion of powder.

The preimpregnated materials of the prior art are formed from fibrous elements such as mats, boards, sheets in which resins are introduced in the form of powder by sintering or electrostatic powdering. These resins, in order to be held in these elements, are melted and not cross linked, otherwise these elements could no be handled. Such melting results in connection of the fibers and these become rigid or semirigid.

Other cases of reacting elements have also been contemplated, such as stacks of film generating products or powder stacked with fabrics or mats. In both cases, the reaction obtained during formation of the composite material only gives a roving coating, that is to say the viscosity of these products in the molten state is too high to penetrate inside the rovings and the unitary fiber.

The work carried out for increasing the proportion of powders incorporated in the fibrous material has shown an important relationship to be complied with between the grain size of the powder and the diameter of the unitary filaments forming the fibrous material.

Finally, the work on which the present invention is based has allowed the nature of the materials forming the synthetic resin powder and that of the synthetic resin forming the coating to be determined with great accuracy so as to form pairs of both resins in which the specificity of the bonding between the partners allows surprising results to be obtained of capital importance in the field of use, namely the possibility of obtaining composite materials resisting severe temperature conditions in which, contrary to the prior process, are obtained by treatment at temperatures allowing equipment of current quality to be used, that is to say working at extrusion and forming temperatures not exceeding 180° C., whereas before, to reach comparable results, it was indispensable to operate at very high temperatures, for example in the order of 260° C., which is the melting temperature of a 6.6 polyamide.

In addition, the melting viscosity of the plastic powders described in the prior art is such that it is difficult to completely eliminate bubbles when passing through heat in a mold, even by exerting high pressure.

The choice of modified heat hardenable or thermoplastic powders having by nature much lower melting viscosities allows the problem to be overcome and forms one of the essential features of the invention.

SUMMARY OF THE INVENTION

The preimpregnated material of the invention is mainly characterized by the interpenetration in solid powder form of constituent n° 1 at the level of the unitary filament (6 to 20 microns) forming the rovings of the matrices without any connection between the unitary fibers and these matrices and shielding or coating of this roving interpenetrated by a second flexible product constituent n° 2. The shield obtained by extrusion, coating or lapping has three main functions:

to maintain the powers within the roving, to protect this interpenetrated roving during subsequent handling for obtaining semi products (such as woven materials, braids, knitted materials, mats) or forming filamentary windings, serves as cross linking agent in certain cases by combining or being compatible with the basic powder.

These two elements: powder and shield or coating are inseparable and of prime importance.

In fact:

A single powder simply dispersed could not be held within the roving during subsequent handling, A powder of thermosetting type products which is only heated to soften without cross-linking would give a connection between the fiber and the matrix making the whole of the roving rigid, A single shield of products by simple or multiple extrusion of reactive products such as indicated in other patents would only be a roving coating and not a thorough interpenetration along capable of giving a composite material with important properties.

This roving remains flexible and may be handled for obtaining semi products. These semi products are formed by transformation of a basic preimpregnated threat for forming mats, woven materials, knitted or cut materials.

The core matrix gives products different from those obtained by a posteriori impregnation on mats or woven materials.

The products forming the element interpenetrating the roving in the form of powder and the shielding or coating products must be compatible, reactive or complementary depending on the desired purpose of the final composite material so that during the formation of the composite material obtained by raising the temperature the final product comprises the properties of a composite material with homogeneous matrix.

The method of fabricating preimpregnated filaments formed of continuous reinforcement fibers interpenetrated at the level of the unitary filament forming the roving in solid powder form but without any connection between the fiber and the powder and shielding of this interpenetrated roving by a product which remains flexible, compatible or reacting with the basic powder interpenetrating the roving is characterized by the following steps:

Introduction of the thermo-setting or thermo-plastic powders within the roving previously opened out so that the unitary fiber may be reached:

covering of said roving by means of a thermoplastic resin layer at a temperature allowing no reaction with the basic powder, the reaction occurs when this preimpregnated material in its initial form or in its semiproduct form is used for forming a composite material, that is to say at a temperature allowing the reaction of the shielding and powder products.

The method of this invention is further characterized in that a roving laid flat of unitary metal, mineral or synthetic filaments is treated at ambient temperature by means of a powder, whose grain size is substantially equal to the diameter of the unitary filaments, of a plastic, thermosetting or thermoplastic material whose softening, respectively melting point is less than 180° C. so as to cause the powder to be retained within said roving in a proportion which may vary between 5 and 25% by weight of the roving, immediately after this treatment said rovings loaded with powder are coated in an extruder with a thermoplastic material at the melting temperature of said thermoplastic material not exceeding 180° C., then the roving thus coated is cooled rapidly so as to obtain a coated roving of great flexibility, which material, possibly after storage in the wound condition, plaiting, or weaving, is placed in a mold and processed under pressure at a temperature not exceeding 170° C. so as to obtain a composite material piece whose deformation temperature is at least 150° C.

The material forming the powder is chosen from the group of thermosetting polymers including the epoxides, the phenolics, the polyesters with end groups —COOH, the polyimides, the acrylics and the polyurethanes and the material forming the coating is chosen from the group of thermoplastic polymers including the polyamides, the linear polyesters, the polyacetals, the polyalkylmethacrylates, whose reactive groups are likely to lead to condensation, cross linking or transesterification reaction with the reactive groups of the material forming the powder, during transformation of the powder loaded coated roving to form a composite piece under the above mentioned conditions of pressure and temperature.

As a variant, the material forming the powder is chosen from the group of thermoplastic polymers including the polyamide prepolymers of molecular weight varying between 1000 and 3000 modified by diamines introducing end groups —NH$_2$, polyolefins modified by maleic anhydride or acrylic acid introducing lateral groups —COOH, vinyl ethylene-acetate terpolymers of vinyl-maleic anhydride and vinyl ethylene-acetate copolymers grafted by the acrylic radical and a material forming the coating is chosen from the group of thermoplastic polymers including the polyamides and the copolyamides of molecular weight varying between 40,000 and 60,000, the linear polyesters, the non modified polyolefins of molecular weight between 100,000 and 200,000 and the vinyl ethylene-acetate copolymers, when the powder is not formed of such a powder, the reactive groups of the material forming the powder being likely to react with the reactive groups of the material forming the coating during transformation of the powder charged coated roving to form a composite piece under the conditions of pressure and temperature mentioned.

Among the preferred embodiments, a phenolic resin powder is chosen and the coating is made from polyvinylbutyral, copolyamide 6-11 or copolyamide 6-12.

In another embodiment, a polypropylene powder is chosen modified by maleic anhydride and the coating is made from partially hydrolized vinyl ethylene-acetate.

In another embodiment, polyamide prepolymer powder 11 is chosen and the coating is made from copolyamide 6-12, terpolyamide 6, 6-6, 12 or polymethacrylate copolymer.

The fibrous material is formed preferably by glass, carbon, boron, Kevlar (trademark of Du Pont de Nemours, semiaromatic polyamide with high melting point) or metal filaments. The invention also relates to a rigid thermostable piece made from a composite material indeformable to heat at a temperature of at least 150° C., which piece is formed by flexible metal, mineral or synthetic filament rovings charged with plastic material powder, thermosetting or thermoplastic, whose softening, respectively melting point does not exceed 180° C., coated with a thermoplastic material to a thickness of the order of 10 to 50 micron, hardened during forming and baking under pressure at a temperature not exceeding 170° C.

DESCRIPTION OF THE PREFERRED EMBODIMENT

Other features of the invention will be clear from the following description of the operating conditions.

The roving formed of unitary glass, carbon, Kevlar or metal wire filaments is unwound from its reel and laid flat by means of a roller for spacing the fibers apart as much as possible.

The diameter of the unitary filaments is between 5 and 10 micron. Then, the roving thus laid flat passes through a fluidized powder bath, electrostatic or not, formed of particles of plastic material whose mean diameter is also between the limits corresponding to the diameter of the filaments.

By electrostatic attraction effect, created either by the charge developed on the fiber by friction or by the charge imparted to the particles, the particles of powder adhere to the unitary fibers.

The fluidized bed may be advantageously replaced by an electrostatic powder gun projecting charged particles on the roving laid flat.

It is only necessary to develop an electrostatic charge on the powder particle in the case where the roving is formed of conducting fibers, for example in the case of metal wires. This charge may be provided either in an electrostatic fluidized bed, or by means of an electrostatic powder gun.

The powder charged roving is not stable more than a few hours, for the electrostatic charge gradually disappears and the powder will fall from its support. This powder should then be fixed in position immediately after powdering.

For this, the powder charged roving passes through an extruding die where a thermoplastic material envelope is fitted round and forms a continuous sleeve imprisoning the powder and the roving. On leaving the extruder, the plastic coating is cooled and the final product obtained is wound on a mandrel.

It is the winding system actuated by the mandrel which drives the roving and imparts the desired speed to the powdering and coating operations. The resulting product is characterized by the amount of powder retained by the roving. This depends on the length of time the roving stays in the fluidized bed, that is to say on the length of the fluidized bed the travelling speed of the roving. By way of indication a fluidized bed may be used of 1 meter in length for a speed of 150 to 200 m/min, the roving under these conditions will retain 8 to 15% of its weight of powder. If the powdering is provided by means of an electrostatic gun, the roving must be powdered over a length of 30 to 40 cm so as to obtain a comparable deposition of powder at this speed.

Depending on the rovings used and on the linear speeds, the weight of powder retained may vary between 5 and 25% of the weight of the roving. Insofar as the thickness of the thermoplastic sheath is concerned, the weight of the coating should be reduced to a minimum so that the final composite material piece contains a maximum percentage of fibers. Care will however be taken to obtain, via the coating, a high mechanical strength and, for this, thermoplastic polymers are used having a high molecular weight while remaining easy to extrude.

For example, for polyamides and linear polyesters, molecular weights vary from 40,000 to 60,000, whereas for polyolefins, molecular weights are used varying from 100,000 to 200,000.

Other materials forming the coating may be the polyacetals, polyvinyl chloride, polyvinyl acetate, the partially hydrolized vinyl ethylene-acetate copolymer, the polycarbonates, the polyvinyl butyrals, polystyrene, the polymethacrylates and others. A coating should also be sought as thin as possible, while keeping sufficient mechanical strength.

It is difficult for technological reasons to go below a thickness of 10. This is why this sheath represents in the final product a higher percentage by weight for rovings of low tex. This percentage is generally between 5 and 25% of the weight of the roving. Thus a final product is obtained which may be designated as solid polymer impregnated roving (S.P.I.R.), whose composition is approximately the following:

Fibers: 50 to 80%
Powder: 10 to 25%
Coating: 10 to 25%

The powder contained in the powder charged roving must not melt at the time of passing through the extruder head. This is achieved by appropriate choice of thermoplastic polymer forming the coating and by rapid cooling thereof on leaving the extruder.

If, in fact, the powder melted at the time of forming the coating, it would bond the fibers together and, after cooling, the powder impregnated roving (S.P.I.R.) obtained would have a character of rigidity which would make it unsuitable for subsequent shaping.

By an appropriate choice of the polymers forming the powder of the coating the following are obtained:

easy implementation by weaving, plaiting, winding of the powder charged roving, transformation at temperatures currently used in the fabrication of composite pieces using conventional methods, that is to say between 140° and 170° C., a final thermostable composite piece by a cross linking, polycondensation or other reaction between the polymer forming the coating and that forming the powder. After heat transformation, a three dimensional polymer matrix is always obtained.

The choice of the powder polymer and coating polymer pair is therefore fundamental and forms the essential feature of the invention.

Two cases are to be considered:

First case: The powder is formed of a thermosetting polymer.

The choice relates to:
the epoxy powders,
the phenolics,
the polyurethanes,
the polyesters,
the acrylics.

The following pairs have been successfully tried:

| Coating | | Thermosetting |
|---|---|---|
| Polyamides in particular | | |
| Copolyamides 6-12 | $p_f$ 130° C. | phenolics, epoxy or polyurethanes |
| terpolyamides 6,6-6,12 | $p_f$ 105° C. | |
| linear polyester | | polyester |
| polyacetals | | polyester |
| polyvinylbutyral | | phenolics |
| polymethylmethacrylate | | acrylics |

The above mentioned powders are in general available commercially and are used, insofar as the epoxy, polyurethanes, polyesters and acrylics are concerned for metal coatings and, insofar as the phenolic powders are concerned, for molding pieces.

They have then their own catalytic system allowing cross linking thereof at temperatures of the order of 140°-160° C. Their melting points are situated mostly below 130° C. It has been confirmed that, under the conditions of use of powder charged rovings (S.P.I.R.), they also react with appropriate thermoplastic polymers.

Although the mechanism of these reactions has not been explained, it seems that: 1° in the case of polyamides, the terminal groups —COOH react in the case of phenolic powders with the free phenolic groups, for the polyamides are partially soluble in phenolic resins, in the case of epoxy powders, with the epoxied groups. In addition, the catalysts of the hexamethylene tetramine type present in the epoxy powder are likely to form bridges between the epoxy chains and the polyamide chains.

In the case of polyurethanes, the two types of polymers, the polyamides and polyurethanes, are compatible and the free —NCO epoxy groups or released by heating.

Second case: The powder comprises a modified thermoplastic polymer or prepolymer in order to introduce reactive groups in the chain. The thermoplastic polymer or prepolymer are chosen from the following:

polyamide prepolymers of molecular weight of 1000 to 3000 modified by diamine in order to obtain —NH$_2$ terminal groups polyolefins modified by maleic anhydride or acrylic acid and having lateral —COOH groups copolymers ethylene-vinyl acetate (EVA) partially hydrolized having lateral —OH groups ethylene-vinyl acetate-maleic anhydride terpolymers The coating is chosen from modified or nonmodified thermoplastic compatible polymers. The following pairs have been successfully tried:

| Powder | Coating |
|---|---|
| maleic anhydride modified PP | PP or EVA-OH |
| acrylic grafted PP | PP |
| polyamide 11 diamino prepolymer | polyamides in general, among them copolyamide 6-12 terpolyamide 6,6-6,12; or polymethacrylates; or, their copolymers |
| terpolymers EVA-maleic anhydride and acrylic grafted copolymers | EVA-OH; or polyethylene |

EXAMPLE 1

A roving of glass fibers of 320 tex is passed through a fluidized bed formed by a phenolic powder of commercial name Alresen PA 102 (HOECHST) ($p_f 125°$ C.).

Passage speed: 100 m/min
Length of fluidization bed: 0.4 m

After being charged with powder, the roving passes through an extruder head where a polyamide Platamide H 104 (PLATE-BONN) ($p_f 105°$ C.) coating is applied.

After cooling, a solid powder charged roving (S.P.I.R.) is obtained of the following composition:

Glass: 70%
Powder: 16%
Coating: 14%

The roving is woven and the woven material obtained is transformed in the following way so as to obtain a hollow body having the shape of a plate 15 cm in diameter and 3 cm in depth.

Four layers of woven fabric are disposed in an appropriate mold. The pressure of 10 kg/cm$^2$ is applied and a temperature of 170° C. is maintained for a period of 10 minutes.

After cooling a homogeneous piece is obtained without bubbles.

This piece is subjected to the following test, currently practiced in the car industry.

Filling the hollow body with motor oil.
Maintaining a temperature of 150° C. for a week.
There is no sweating or deformation.

In order to obtain a comparable result having a fine polyamide powder, it would be necessary to use a polyamide 6.6 whose melting point is 260° C., which would have required an installation of a non current type, so expensive.

Subjected to the action of flames, the plate charred without melting or softening.

It may be concluded that, for a comparable result operating in accordance with prior methods, implementation is more difficult, even impossible with current existing equipment.

In addition, the suitable behavior of an object made from polyamide alone in the prior art, exposed to the hot oil test, is of shorter duration than that of the cross linked phenolic resin product of the present invention.

EXAMPLE 2

The procedure as in example 1, but the powder is a phenolic powder named Alresen PT 214 (HOECHST) whose $P_f$ is 70° C. and whose sheath is made from polyvinylbutyral Piologorm B.S. (WACKER-CHEMIE).

The roving is formed of Kevlar (registered trademark of Du Pont de Nemours).

Speed of production: 150 m/min
Length of fluidized bed: 0.50 m

An S.P.I.R. was obtained of the following composition:

Fiber: 60%
Powder: 25%
Coating: 15%

Elements cut from S.P.I.R. parallel and in the length of the direction are disposed in a parallelepipedic mold 10 cm in length, 4 mm in height and 1 cm in width.

A pressure of 10 kg/cm$^2$ was applied at a temperature of 140° C. for five minutes. After cooling, a homogeneous bar was obtained whose deformation temperature is greater than 200° C.

EXAMPLE 3

The procedure is as in the preceding cases, but the roving is made from carbon fiber 3K, commercialized by TORAY.

The powder is an epoxy powder epikote 1001 (SHELL). The coating is made from copolyamide 6-12, whose $P_f$ is 130° C.

Speed of production: 50 m/min
Length of fluidization bed: 30 cm
Composition obtained:
Fibers: 54%
Powder: 24%
Coating: 22%

Using the same method as for example 2, a homogeneous bar is obtained whose deformation temperature under load is 180° C.

EXAMPLE 4

The procedure is as for the preceding examples, but the roving is made from glass fibers of 1200 tex.

The powder is polypropylene modified by maleic anhydride, $P_r 160°$ C. The coating is made from EVA comprising groups —OH of the trademark Levasint (BAYER), $P_f 110°$ C.

Speed of production: 50 m/min
Length of fluidization bed: 0.40 m

Composition by weight of solid powder charged roving:

Fiber: 70%
Powder: 13%
Coating: 17%

A bar is formed as before by placing the S.P.I.R. under a load of 10 kg/cm$^2$ at 170° C. for ten minutes.

After cooling, it was discovered that the deformation temperature was 210° C.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A method of manufacturing thermostable composite material pieces from rovings of fibrous materials having a coating of thermoplastic resin, comprising the steps of:

incorporating in the roving a powder of a synthetic resin having reactive groups chosen to be able to react with reactive groups of the thermoplastic resin coating at a temperature not exceeding 170° C., said powder being incorporated within the roving at 5 to 25% of the weight of the roving;

coating the powder charged roving with the thermoplastic resin in an extruder at a temperature not exceeding 180° C.;

rapidly cooling the coated roving so as to obtain a roving of great flexibility; and, placing the coated roving in a mold and treating the coated roving under pressure at a temperature not exceeding 170° C., so as to obtain a composite material whose heat deformation temperature is at least 150° C.

2. A method as claimed in claim 1, further comprising the step of storing the coated material in a rolled state before the coated material is placed in the mold and treated under pressure at a temperature not exceeding 170° C.

3. The method as claimed in claim 1, wherein the material forming the powder is chosen from the group of heat hardenable polymers including the epoxides, the phenolics, the polyesters with terminal groups —COOH, the polyimides, the acrylics and the polyurethanes and the material forming the thermoplastic material is chosen from the group of thermoplastic polymers including the polyamides and the copolyamides of molecular weight from 40,000 to 60,000 the vinylics, the linear polyesters, the polyacetals, the polycarbonates and the polyalkymethacrylates, whose reactive groups are likely to lead to condensation, cross linking or transesterification reaction with the reactive groups of the material forming the powder, during transformation of the powder charged coated roving into a composite piece under the conditions of pressure and temperature indicated.

4. The method as claimed in claim 1, wherein the material forming the powder is chosen from the group of thermoplastic polymers including the polyamide prepolymers of molecular weight varying between 1000 and 3000 modified by diamines introducing terminal groups —NH$_2$, polyolefins modified by maleic anhydride or acrylic acid introducing lateral groups —COOH, partially hydrolized EVA copolymers having lateral groups —OH, the E-VA-maleic anhydride terpolymers and EV copolymers grafted by the acrylic radical and the material forming the coating is chosen from the group of thermoplastic polymers including the polyamides and the copolyamides of molecular weight between 40,000 and 60,000, the linear polyesters, non modified polyolefins of molecular weight between 100,000 and 200,000 and partially hydrolized EVA copolymers, when the powder is not formed by such a copolymer, the reactive groups of the material forming the powder being likely to react with the reactive groups of the material forming the coating during transformation of the powder charged and coated roving into a composite piece under the conditions of pressure and temperature indicated.

5. The method as claimed in claim 3, wherein a phenolic resin powder is chosen and the coating is made from polyvinylbutyral, copolyamide 6-11 or copolyamide 6-12.

6. The method as claimed in claim 4, wherein a polypropylene powder is chosen modified by maleic anhydride and the coating is made from partially hydrolized EVA.

7. The method as claimed in claim 4, wherein a polyamide prepolymer 11 powder is chosen and the coating is made from copolyamide 6-12, terpolyamide 6, 6-6, 12 or polymethacrylate copolymer.

8. The method as claimed in claim 4, wherein a diamined polyamide prepolymer 11 powder is chosen and the coating is made from a copolyamide 6-12, terpolymer 6, 6-6, 12 or polymethacrylate copolymer.

9. The method as claimed in claim 1, wherein a roving of unitary filaments laid flat by means of a roller is treated at ambient temperature by causing it to pass through a fluidized bed containing fine particles of powder.

10. The method as claimed in claim 9, wherein an electrostatic attraction is created charging either the powder particles or the filaments of the roving electrically.

11. The method as claimed in claim 9, wherein the filaments travel over a distance of a meter through a fluidized bed at the speed of 150 to 200 m/min, so that the weight of the powder retained is 5 to 25% of the weight of the initial roving.

* * * * *